(12) United States Patent
Böckler et al.

(10) Patent No.: US 11,938,542 B2
(45) Date of Patent: Mar. 26, 2024

(54) METHOD FOR FINISHING A WORKPIECE MADE BY ADDITIVE MANUFACTURING

(71) Applicant: Messer SE & Co. KGaA, Bad Soden (DE)

(72) Inventors: Thomas Böckler, Würselen (DE); Matthias Dusil, Dusseldorf (DE); Bernd Hildebrandt, Tönisvorst (DE); Dirk Kampffmeyer, Linnich (DE); Georg Selders, Weeze-Wemb (DE)

(73) Assignee: Messer SE & Co. KGaA, Bad Soden (DE)

( * ) Notice: Subject to any disclaimer, the term of this patent is extended or adjusted under 35 U.S.C. 154(b) by 144 days.

(21) Appl. No.: 17/291,137

(22) PCT Filed: Dec. 10, 2019

(86) PCT No.: PCT/EP2019/084460
§ 371 (c)(1),
(2) Date: May 4, 2021

(87) PCT Pub. No.: WO2020/126684
PCT Pub. Date: Jun. 25, 2020

(65) Prior Publication Data
US 2021/0387260 A1      Dec. 16, 2021

(30) Foreign Application Priority Data

Dec. 20, 2018 (DE) .......................... 102018010079.1

(51) Int. Cl.
*B22F 3/24* (2006.01)
*B22F 10/64* (2021.01)
(Continued)

(52) U.S. Cl.
CPC ................ *B22F 3/24* (2013.01); *B22F 10/64* (2021.01); *B33Y 40/20* (2020.01); *C21D 1/18* (2013.01); *C21D 6/04* (2013.01); *C22F 1/002* (2013.01)

(58) Field of Classification Search
CPC ........ B22F 3/24; B22F 10/64; B22F 2998/10; B22F 2999/00; B22F 10/25; B22F 3/10;
(Continued)

(56) References Cited

U.S. PATENT DOCUMENTS 3,819,428 A    6/1974   Moore
5,442,929 A    8/1995   Gillin
(Continued)

FOREIGN PATENT DOCUMENTS

CN    103463739 A    12/2013
CN    104087729 A    10/2014
(Continued)

OTHER PUBLICATIONS

A. Ciski et al: "Multistage cryogenic treatment of X153CrMoV12 cold work steel", IOP Conference Series: Materials Science and Engineering, vol. 461, iss. 1, Dec. 10, 2018, pp. 1-6 XP055657645, DOI: 10.1088/1757-899X/461/1/012012 (Year: 2018).*
(Continued)

*Primary Examiner* — Rebecca Janssen
(74) *Attorney, Agent, or Firm* — Andrus Intellectual Property Law, LLP

(57) ABSTRACT

According to the invention, a metal workpiece made by additive manufacturing is subjected, following the additive manufacturing process, to a cold treatment in which the workpiece is cooled to a lower target temperature of less than minus 30° C. in a cooling phase and is then heated up to an upper target temperature in a heating phase. The cold
(Continued)

treatment significantly improves the properties of the workpiece in respect of the mechanical quality thereof.

15 Claims, 1 Drawing Sheet

(51) Int. Cl.
*B33Y 40/20* (2020.01)
*C21D 1/18* (2006.01)
*C21D 6/04* (2006.01)
*C22F 1/00* (2006.01)

(58) Field of Classification Search
CPC .... B22F 2003/248; B22F 10/28; B33Y 40/20; C21D 1/18; C21D 6/04; C22F 1/002; Y02P 10/25
See application file for complete search history.

(56) References Cited

U.S. PATENT DOCUMENTS

| 6,537,396 | B1 | 3/2003 | Ijames | |
| 7,297,418 | B2 | 11/2007 | Watson | |
| 2004/0182202 | A1* | 9/2004 | Geving | B33Y 70/10 75/252 |
| 2022/0033948 | A1 | 2/2022 | Bockler et al. | |

FOREIGN PATENT DOCUMENTS

| CN | 104129083 A | 11/2014 |
| CN | 105586477 A | 5/2016 |
| CN | 108588582 A | 9/2018 |
| DE | 2517147 A1 | 10/1976 |
| DE | 19904348 A1 | 8/2000 |
| EP | 0195759 A2 | 9/1986 |
| EP | 1242929 A2 | 9/2002 |
| EP | 1842929 A1 | 10/2007 |
| WO | 2011099711 A2 | 8/2011 |
| WO | WO 2015155745 A1 | 10/2015 |
| WO | 2020070143 A1 | 4/2020 |

OTHER PUBLICATIONS

C.A. Jagadish et al., "Effect of Cryogenic Treatment on the Mechanical Properties of 18Ni-300 Grade Maraging Steel Built Using the Direct Metal Laser Sintering (DMLS) Technology", Key Engineering Materials, Nov. 17, 2016, pp. 114-121, vol. 719.

Kampffmeyer, Dirk et al., "Device and Method for Additive Manufacturing Under Protective Gas", U.S. Appl. No. 18/002,317, filed Dec. 19, 2022 (specification, claims and drawings only).

Hildebrandt, Bernd et al., "Method and Apparatus for Additive Manufacturing Under Protective Gas", U.S. Appl. No. 18/000,754, filed Dec. 5, 2022 (specification, claims and drawings only).

W. Lausecker, "Wie cool ist das—Die Tieftemperaturbehandlung von Zerspanung-Werkzeugen" [How cool is that—the low-temperature treatment of machining tools], Werkzeug-Technik 126, Jun. 15, 2012.

C.A. Jagadish et al., "Effect of Cryogenic Treatment on the Mechanical Properties of 18Ni-300 Grade Maraging Steel Built Using the Direct Metal Laser Sintering (DMLS) Technology", Key Engineering Materials, Nov. 1, 2016, pp. 114-121, vol. 719.

A. Ciski et al., "Multistage cryogenic treatment of X153CrMoV12 cold work steel", IOP Conference Series: Materials Science and Engineering, Dec. 10, 2018, p. 012012, vol. 461.

International Search Report issued in corresponding PCT Application No. PCT/EP2019/084460, dated Jan. 21, 2020.

Written Opinion issued in corresponding PCT Application No. PCT/EP2019/084460, dated Jun. 25, 2020.

W. Mohler et al: "Stromkontaktrohre Mit verbesserten Eigenschaften—hergestellt aus stranggepressten Werkstoffverbunden," Doctoral thesis presented at the Chemistry Department of the Universite de Lausanne, Dusseldorf, Germany, vol. 53, No. 9, Sep. 1, 2001, pp. 616-619.

* cited by examiner

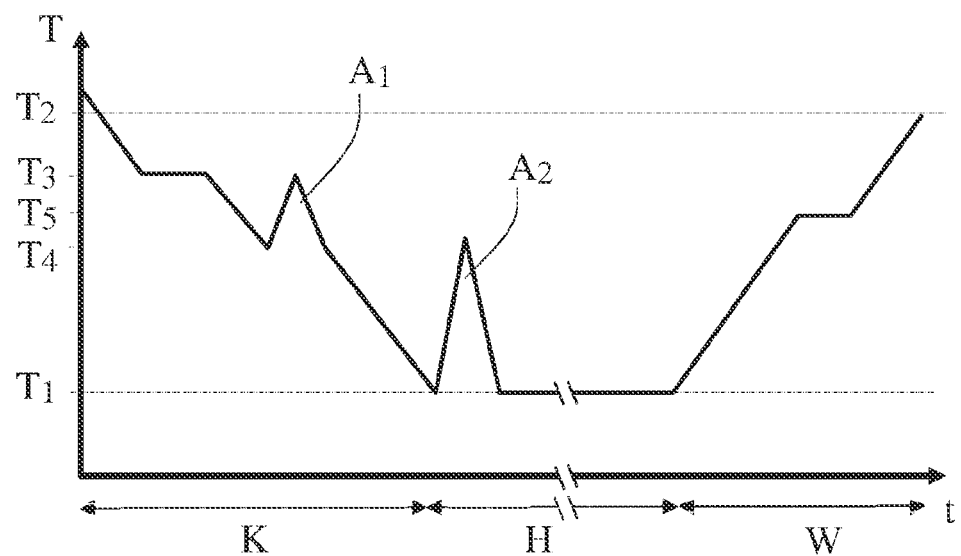

METHOD FOR FINISHING A WORKPIECE MADE BY ADDITIVE MANUFACTURING

CROSS-REFERENCE TO RELATED APPLICATIONS

This application is the U.S. national stage application of International Application No. PCT/EP2019/084460, filed Dec. 10, 2019, which International Application was published on Jun. 25, 2020, as International Publication WO 2020/126684 in the German language. The International Application claims priority to German Application No. 10 2018 010 079.1, filed Dec. 20, 2018. The International Application and German Application are hereby incorporated herein by reference, in their entireties.

FIELD

The invention relates to a method for after-treating a metallic workpiece produced by means of additive manufacturing.

BACKGROUND

In present-day production, there is an increasing trend towards additive manufacturing processes. This expression here generally refers to manufacturing processes in which a three-dimensional workpiece is produced layer-by-layer from a material composed of metal or polymer. Although use thereof has hitherto been restricted predominantly to the manufacture of prototypes, a great potential for use in mass production, in particular for series of relatively small numbers of items and/or for production of complex three-dimensional components which are employed, for example, in aerospace, the automobile industry or in medical technology, is increasingly being seen.

In powder bed-based additive manufacturing processes, a pulverulent material is applied in a thin layer to a working surface. The material is melted or sintered with point precision by means of an energy beam, in particular a laser beam or an electron beam, according to a computer-aided model. The melted or sintered material forms, on resolidification, a fixed contour (here also referred to as "workpiece contour") which is joined to previously produced contours and/or contours which are subsequently produced in the same way to form a workpiece. In this way, it is possible to build up, in particular, shaped bodies which have a sometimes highly complex three-dimensional structure. Powder-based additive manufacturing processes are, for example, electron beam melting (EBM), selective laser beam melting (SLM) or selective laser sintering (SLS).

Furthermore, consideration is being given to using powder spraying processes for the additive manufacture of workpieces. In powder spraying, a pulverulent material is applied by means of a carrier gas to a substrate and melted by means of an energy beam. As energy beam, use is generally made of a plasma beam (plasma powder buildup welding) or a laser beam (laser metal deposition, LMD).

In order to protect the workpiece against adverse effects of the surrounding atmosphere, powder-based additive manufacturing processes usually take place under protective gas or under reduced pressure. After manufacture is complete, the workpiece or the workpiece contour has to cool before further processing. If a protective gas is employed, this can assist the process of cooling; in the case of additive manufacturing processes which are carried out under reduced pressure, the finished workpiece contour has to be cooled and the previously evacuated irradiation chamber has to be flooded with a gas to ambient pressure. Here, it is possible, in particular, to flood the irradiation chamber with an inert gas, for example helium, which simultaneously serves to cool the workpiece, which has been heated as a result of manufacture, back to ambient temperature.

For example, WO 2015/155745 A1 describes a process for producing a workpiece by means of additive manufacturing, in which a layer of a pulverulent starting material is provided in an evacuated irradiation chamber. This layer is preheated and subjected to a selective melting process by treatment with an energy beam under reduced pressure, which gives a workpiece contour which has to solidify by cooling to ambient temperature. In order to accelerate the cooling process, the irradiation chamber is flooded with an inert cooling gas stream. As cooling gas, use is made of, for example, helium or argon.

To stabilize the workpieces during production thereof in the case of production by means of powder processes, it is also known that metal powders can be mixed with a binder, usually a polymer, and pressed layer-after-layer. After manufacture, the workpiece is subjected to a heat treatment in which the binder is driven out by heating. The workpiece is subsequently sintered at high temperature.

As an alternative to powder-based manufacturing processes, wire-based additive manufacturing processes have become established. In these processes, a metal wire is melted by means of an energy source. The properties of the component manufactured are determined essentially by the choice of the metal or of the metal alloy of the wire used. As energy source, it is here possible to use laser beams, electron beams or electric arcs (Wire Arc Additive Manufacturing, WAAM).

It is common to all processes described for 3D printing that, after manufacture, the workpieces are generally subjected to a heat treatment with the objective of dissipating residual stresses, homogenizing the component microstructure and also optimizing the mechanical quality values. The heat treatments are carried out in heat treatment ovens under a protective gas atmosphere or under reduced pressure.

SUMMARY

It is an object of the invention to achieve a further improvement in mechanical properties of workpieces produced by means of additive manufacturing.

The object of the invention is achieved by a method having the features of claim 1. Advantageous embodiments of the invention are claimed in the dependent claims.

According to the invention, an after-treatment is carried out on a metallic workpiece produced by means of additive manufacturing, wherein the workpiece is subjected to a cold treatment in which it is cooled in a cooling phase to a lower target temperature of below −50° C. and subsequently warmed in a warming phase to an upper target temperature.

For the present purposes, a workpiece produced by means of additive manufacturing is a workpiece which is made up of workpiece contours generated layer-by-layer, which contours are in turn produced by melting a metallic, in particular pulverulent or wire-like, base material. As base material, it is possible, for the purposes of the present invention, to use all customary metallic base materials used for additive manufacturing, in particular those based on aluminum, steel, stainless steel, copper or nickel.

For the purposes of the present invention, a "cold treatment" is a process in which a workpiece is subjected to temperatures of −50° C. and below. The cold treatment is preferably carried out in a closed vessel (cold chamber) in which an appropriately low treatment temperature is set by direct or indirect thermal contact of the workpiece with a coolant. For example, an atmosphere at an appropriate temperature is produced in a cold chamber into which the workpiece to be treated has previously been introduced, as a result of which uniform cooling of the workpiece from all sides is achieved. The atmosphere at an appropriate temperature in the cold chamber is produced, for example, by introducing the coolant into the cold chamber. As coolant, preference is given to using a cryogenic medium which has been brought to a prescribed temperature of, for example, from −150° C. to −185° C. For example, the coolant is cold gaseous nitrogen which has been produced by mixing warm nitrogen gas with liquid nitrogen in a cold gas mixer or is a cooling gas such as nitrogen or a noble gas which has been brought to temperature by indirect cooling by means of liquid nitrogen in a heat exchanger.

It has surprisingly been found that the cold treatment according to the invention has a positive influence on the properties of workpieces which are produced in additive manufacturing by sintering or by melting and solidification. The cold treatment reduces, in particular, residual stresses which arise within the melted workpiece contours during the solidification phase during manufacture and/or in the connecting layer between these contours. The cold treatment assists the homogenization of the material in the workpiece and thus determines the mechanical quality values. Particular emphasis may be placed on an increase in the wear resistance and the hardness.

The cold treatment according to the invention is suitable for all workpieces which have been produced by conventional additive manufacturing processes and is particularly suitable for the after-treatment of workpieces which have been produced by means of powder bed processes, powder spraying processes or wire-based additive manufacturing processes.

The cold treatment according to the invention is carried out subsequent to manufacture of the workpiece and can be carried out alone or in addition to a heat after-treatment of the workpiece, in the latter case before and/or after the heat after-treatment and/or between two stages of a heat after-treatment. In all these cases, improvements can be expected in respect of the mechanical quality values of the metallic components.

Cold treatments of metallic workpieces are known, for example, from U.S. Pat. No. 6,537,396 B1, U.S. Pat. No. 3,819,428 B1, EP 124 29 29 A1, CN 103 463 739 A and the article by W. Lausecker, "Wie cool ist das—Die Tieftemperatur-behandlung von Zerspanung-Werkzeugen", Werkzeug-Technik 126, Jun. 15, 2012, and relate, in particular, to the transformation hardening of steel. Here, the hardness of a workpiece produced from one piece is increased by the workpiece being, after its manufacture and a subsequent heat treatment, cooled down to a temperature in the range from −70° C. to −180° C. and held at this temperature for a time of, for example, 15 hours. On the other hand, a cold treatment as after-treatment of workpieces which have been produced by means of additive manufacturing from a plurality of workpiece contours has not yet been described.

The lower target temperature, i.e. the lowest cooling temperature during the cold treatment of the invention, is preferably in the range from −50° C. to −195° C., particularly preferably from −100° C. to −185° C., with values below −150° C. displaying particularly good results.

The upper target temperature which concludes the method is a temperature value which is suitable for preventing the condensation of water from a surrounding atmosphere, in particular under standard conditions (20° C.), in order to avoid corrosion on the workpiece surface. Until the upper target temperature has been attained, the cold treatment of the invention is therefore preferably carried out in an inert atmosphere having a low water content, for example in an atmosphere which consists predominantly of gaseous nitrogen and/or a noble gas. For example, the upper target temperature is in the range from 20° C. to 40° C.

In a preferred embodiment of the invention, the workpiece goes through a hold phase in which the workpiece is maintained for a time of at least 30s at the lower target temperature after the cooling phase and before the warming phase. A significant improvement in the wear resistance of the workpiece is obtained even at hold times in the range from 30 seconds to 10 minutes. A hold time exceeding 90 minutes is not necessary according to the invention, even though it is not ruled out. The duration of the hold phase is preferably in the range from 10 minutes to 60 minutes.

The cooling and warming of the workpiece in the cold treatment is preferably carried out slowly in order to ensure that thermal shock does not occur and complete and uniform cooling throughout the workpiece is achieved. It has accordingly been found to be advantageous for the cooling of the workpiece in the cooling phase and/or the warming of the workpiece in the warming phase to occur not more quickly than with a temperature change (rate) $\Delta T/\Delta t$ of $\Delta T/\Delta t \leq 10$ K/min, with preference being given to $\Delta T/\Delta t$ being in the range from 1 K/min to 10 K/min, particularly preferably from 1.5 K/min to 5 K/min (interruption times during cooling and warming not included in each case).

In order to ensure uniform cooling or warming, it is also advantageous to interrupt the cooling or warming of the workpiece a number of times during cooling in the cooling phase and/or during warming in the warming phase and to maintain the workpiece for a prescribed time at a prescribed intermediate temperature (intermediate hold phase). For example, an interruption during which the workpiece is maintained essentially at the temperature attained can be inserted at intervals of from 5K to 50K. After the intermediate hold phase, the cooling process or the warming process is continued as before. During the interruptions, rearrangement processes, which can promote the homogeneity of the workpiece and thus the attainment of positive materials properties, can still take place at a comparatively high diffusion rate in the crystal lattice of the workpiece material. The duration of an intermediate hold phase during the cooling phase and/or the warming phase is, according to the invention, preferably in each case at least 30 seconds, preferably in each case in the range from 1 minute to 120 minutes.

In a particularly advantageous embodiment of the invention, the workpiece is warmed one or more times during the cooling phase and/or hold phase and/or an intermediate hold phase and subsequently cooled again to the lower target temperature or another temperature. Such an intermediate warming phase can occur in place of or in addition to an intermediate hold phase. As a result of the intermediate warming phases, stresses which can occur in the treated material due to temperature changes during the course of the cold treatment of the material are dissipated. Intermediate warming phases together with a cooling rate adapted to the particular workpiece thus increase the quality properties of the workpiece. For example, single or multiple warming in which the initial temperature (i.e. the temperature before commencement of the cold treatment) is not exceeded is carried out during the cooling phase and/or the hold phase. Depending on the initial temperature, warming by at least 10K, preferably at least 50K, for example to a temperature value of in each case from −140° C. to −160° C., is carried out in each case. After this intermediate warming phase, the workpiece is maintained at the low temperature for a certain time or a further intermediate warming phase follows or further cooling to an even lower temperature, in particular to the lower target temperature, is carried out.

The variation of the temperature, i.e. the cooling or warming of the workpiece during the cold treatment, is advantageously effected by production of an atmosphere at an appropriate temperature in a cold chamber containing the workpiece. To produce the atmosphere at the desired temperature in the cold chamber, an inert gas, for example nitrogen or a noble gas, is, for example, brought to an appropriate temperature outside the cold chamber and subsequently fed into the cold chamber. The workpiece is preferably present in an inert atmosphere during the entire cold treatment in order to rule out, in particular, negative influences of atmospheric oxygen and water vapor.

BRIEF DESCRIPTION OF THE DRAWING

A working example of the invention will be described in more detail with the aid of the drawing. The single drawing (the figure) schematically shows, in a temperature (T)-time (t) graph, the course of the temperature of a workpiece produced by means of additive manufacturing during the after-treatment by a method according to the invention.

DETAILED DESCRIPTION

A workpiece which has been produced by means of additive manufacturing and is present, for example, at ambient temperature or, owing to a preceding heat treatment, at a temperature above the ambient temperature, is introduced into a cold chamber and the latter is subsequently closed. The temperature of the atmosphere in the interior of the cold chamber is slowly decreased, for example at a rate $\Delta T/\Delta t$ in the range from 1 K/min to 10 K/min, by introduction of a coolant. To produce the coolant, nitrogen gas is mixed, for example in a separate vessel, with liquid nitrogen or nitrogen gas having a temperature close to the boiling point of nitrogen (—196° C.) in such an amount that the resulting cold nitrogen gas has a prescribed temperature. The coolant is gradually introduced into the cold chamber and thus reduces the temperature of the atmosphere in the interior of the cold chamber and thus the temperature of the workpiece during a cooling phase K to a lower target temperature $T_1$ of, for example, −150° C. After the cooling phase K, the workpiece is maintained at the lower target temperature $T_1$ for a period of, for example, from 1 minute to 100 minutes (hold phase H). After the hold phase H, the workpiece is gradually warmed, i.e. at a warming rate which is comparable to the cooling rate in the cooling phase K, to an upper target temperature $T_2$ (warming phase W) by introduction of a warm gas (for example nitrogen) having a temperature higher than the temperature in the interior of the cold chamber. $T_2$ corresponds, for example, to ambient temperature. After the cold treatment, the additively produced workpiece is taken from the cold chamber and can be passed to further treatment or processing steps. The gas which is taken off simultaneously from the cold chamber during introduction of the coolant or warm gas is discharged into the surroundings or passed to a further use.

During the cooling phase K, the introduction of the coolant can be stopped one or more times and the cooling of the workpiece can thereby be slowed or held at a prescribed temperature. Likewise, during the warming phase W the introduction of warm gas can be interrupted one or more times and the warming rate can in this way be slowed or the workpiece can be held at a prescribed temperature. In these intermediate hold phases, $\Delta T/\Delta t$ is thus<<1 K/min. In the working example shown in the drawing, an intermediate hold phase is carried out in each case during the cooling phase K at the temperatures $T_3$ where $T_1<T_3<T_2$ and during the warming phase W at a temperature $T_5$ where $T_1<T_5<T_2$.

In order to dissipate stresses in the treated material which occur as a result of the cold treatment, it is advantageous to temporarily increase the temperature of the workpiece in the cold chamber during the cooling phase K and/or the hold phase H. In these intermediate warming phases $A_1$, $A_2$, the temperature of the workpiece is increased to an intermediate temperature $T_3$, $T_4$. The intermediate temperature is, for example, from 10K to 50K above the temperature of the workpiece at the beginning of the intermediate warming phase $A_1$, $A_2$, but below the initial temperature before commencement of the cold treatment. In the working example shown here, a first intermediate warming phase $A_1$ to the value $T_3$ is carried out during the cooling phase K and a second warming phase $A_2$, after which the lower target temperature $T_1$ has already been attained, is carried out to a value $T_4$, where in the working example $T_3>T_4$, but this is not absolutely necessary for the purposes of the invention. The warming phase $A_2$ can be followed by a further intermediate warming phase (not shown here), or the workpiece remains at the lower target temperature $T_1$ for a certain period of time.

In some embodiments, the heating and cooling rates of the workpiece during the cooling phase K, the warming phase W, the first intermediate warming phase $A_1$, and/or the second intermediate warming phase $A_2$ may differ from each other. Referring to FIG. 1, the rate of change in the temperature of the workpiece ($\Delta T/\Delta t$) at various points in time during the after-treatment method disclosed herein can be visually compared by a comparison of the slope of the line at the corresponding points in time on the graph of FIG. 1.

During the first intermediate warming phase $A_1$ and the second intermediate warming phase $A_2$, the temperature of the workpiece is raised to a corresponding intermediate temperature $T_3$, $T_4$ before being allowed to cool to the initial temperature at the beginning of the respective intermediate warming phase $A_1$, $A_2$. As illustrated in FIG. 1, the rate at which the temperature of the workpiece increases during the first intermediate warming phase $A_1$ is the same as the rate at which the temperature of the workpiece decreases during the first intermediate warming phase $A_1$. Thus, the heating rate of the workpiece during the first intermediate warming phase $A_1$ and the cooling rate of the workpiece during the first intermediate warming phase $A_1$ are equal. Similarly, the heating rate of the workpiece during the second intermediate warming phase $A_2$ and the cooling rate of the workpiece during the second intermediate warming phase $A_2$ are equal.

In some embodiments, a heating rate of the workpiece and/or a cooling rate of the workpiece during the first intermediate warming phase $A_1$ may be different than a heating rate of the workpiece and/or a cooling rate of the workpiece during the second intermediate warming phase $A_2$. For example, as illustrated in FIG. 1, the slopes of the line of the temperature-time graph during heating and cooling portions of the second intermediate warming phase $A_2$ are steeper than the slopes of the line during heating and cooling portions of the first intermediate warming phase $A_1$. Thus, the heating and cooling rates during the second intermediate warming phase $A_2$ are greater than the heating and cooling rates during the first intermediate warming phase $A_1$.

With continued reference to FIG. 1, the heating rate of the workpiece and the cooling rate of the workpiece during the first intermediate warming phase $A_1$ are different than the cooling rate of the workpiece during the cooling phase K. The slopes of the line of the temperature-time graph during heating and cooling portions of the first intermediate warming phase $A_1$ are steeper than slopes of the line during the cooling phase K. Thus, the cooling rate of the workpiece during the cooling phase K is lower than the heating rate of the workpiece and the cooling rate of the workpiece during the first intermediate warming phase $A_1$.

The invention claimed is:

1. A method for after-treating a metallic workpiece produced by means of additive manufacturing, wherein the workpiece is, after it has been manufactured, subjected to a cold treatment in which the workpiece is cooled in a cooling phase to a lower target temperature of below −30° C., held at the lower target temperature during a hold phase, and subsequently warmed in a warming phase to an upper target temperature;
wherein the cooling phase or the hold phase is interrupted by a first intermediate warming phase in which the workpiece is warmed to a first intermediate temperature and subsequently cooled;
wherein the cooling phase or the hold phase is interrupted by a second intermediate warming phase in which the workpiece is warmed to a second intermediate temperature and subsequently cooled, wherein the second intermediate temperature is different than the first intermediate temperature; and
wherein the cooling phase is interrupted by the first intermediate warming phase and the hold phase is interrupted by the second intermediate warming phase.

2. The method as claimed in claim 1, wherein the workpiece has been manufactured by a powder bed process, a powder spraying process or in an additive manufacturing process by means of supply of wire.

3. The method as claimed in claim 1, wherein the cold treatment is used in addition to a heat treatment of the manufactured workpiece.

4. The method as claimed in claim 1, wherein the lower target temperature is in the range from −50° C. to −195° C.

5. The method as claimed in claim 1, wherein the upper target temperature is in the range from 20° C. to 40° C.

6. The method as claimed in claim 1, wherein the workpiece is held for a time of at least 30 seconds at the lower target temperature during the hold phase.

7. The method as claimed in claim 1, wherein the workpiece is warmed by at least 10° C. during the first intermediate warming phase and/or the second intermediate warming phase.

8. The method as claimed in claim 1, wherein the cooling of the workpiece in the cooling phase and/or the warming of the workpiece in the warming phase and/or at least one of the first and second intermediate warming phases is carried out at a rate of from 1.5° C./min to 10° C./min.

9. A method for after-treating a metallic workpiece produced by means of additive manufacturing, wherein the workpiece is, after it has been manufactured, subjected to a cold treatment in which the workpiece is cooled in a cooling phase to a lower target temperature of below −30° C., held at the lower target temperature during a hold phase, and subsequently warmed in a warming phase to an upper target temperature;
wherein the cooling phase or the hold phase is interrupted by a first intermediate warming phase in which the workpiece is warmed to a first intermediate temperature and subsequently cooled;
wherein the cooling phase or the hold phase is interrupted by a second intermediate warming phase in which the workpiece is warmed to a second intermediate temperature and subsequently cooled, wherein the second intermediate temperature is different than the first intermediate temperature; and
wherein the cooling phase and/or the warming phase and/or at least one of the first and second intermediate warming phases is interrupted for a prescribed period of time during which the workpiece is essentially held at an attained temperature.

10. The method as claimed in claim 7, wherein the workpiece is warmed by at least 50° C. during the first intermediate warming phase and/or the second intermediate warming phase.

11. The method as claimed in claim 1, wherein a heating rate of the workpiece and a cooling rate of the workpiece during the first intermediate warming phase is different than a heating rate of the workpiece and a cooling rate of the workpiece during the second intermediate warming phase.

12. The method as claimed in claim 1, wherein a cooling rate of the workpiece during the cooling phase is different than a heating rate of the workpiece and a cooling rate of the workpiece during the first intermediate warming phase.

13. The method as claimed in claim 12, wherein the cooling rate of the workpiece during the cooling phase is lower than the heating rate of the workpiece and the cooling rate of the workpiece during the first intermediate warming phase.

14. The method as claimed in claim 12, wherein the heating rate of the workpiece during the first intermediate warming phase and the cooling rate of the workpiece during the first intermediate warming phase are equal.

15. The method as claimed in claim 4, wherein the lower target temperature is in the range from −100° C. to −185° C.

* * * * *